United States Patent [19]

Shimizu et al.

[11] Patent Number: 5,767,198
[45] Date of Patent: Jun. 16, 1998

[54] THERMOPLASTIC RESIN COMPOSITION

[75] Inventors: Tetsuo Shimizu; Takayuki Araki; Takafumi Yamato; Yoshihisa Yamamoto, all of Settsu, Japan

[73] Assignee: Daikin Industries, Ltd., Osaka, Japan

[21] Appl. No.: 564,243

[22] PCT Filed: Apr. 26, 1995

[86] PCT No.: PCT/JP95/00833

§ 371 Date: Dec. 20, 1995

§ 102(e) Date: Dec. 20, 1995

[87] PCT Pub. No.: WO95/29956

PCT Pub. Date: Nov. 9, 1995

[30] Foreign Application Priority Data

Apr. 28, 1994 [JP] Japan .................................. 6-091994

[51] Int. Cl.$^6$ .......................... C08L 27/12; C08L 67/03; C08L 67/04
[52] U.S. Cl. ................................. 525/133; 525/151
[58] Field of Search ............................ 525/151, 133

[56] References Cited

FOREIGN PATENT DOCUMENTS

| | | |
|---|---|---|
| 626424 | 11/1994 | European Pat. Off. . |
| 57-145140 | 9/1982 | Japan . |
| 63-230756 | 9/1988 | Japan . |
| 63-264672 | 11/1988 | Japan . |
| 2-110156 | 4/1990 | Japan . |
| 5-105804 | 4/1993 | Japan . |
| 5-230356 | 9/1993 | Japan . |

*Primary Examiner*—Patricia A. Short
*Attorney, Agent, or Firm*—Varndell Legal Group

[57] ABSTRACT

To provide a thermoplastic resin composition which comprises a fluorine-containing polymer having a molecular weight of $5 \times 10^2$ to $5 \times 10^5$ and $2 \times 10^2$ to $1 \times 10^5$ methylol groups per $1 \times 10^6$ carbon atoms at its molecular chain ends and a liquid crystal polyester or in addition a perfluoro type resin having less than $2 \times 10^2$ methylol groups mentioned above, and has improved shrinkage from mold dimensions and dimensional stability represented by a coefficient of linear expansion with maintaining excellent characteristics of the fluorine-containing resin, such as thermal resistance, chemical resistance, weather resistance, surface properties (non-stickiness, excellent friction property), antisoil property and dielectric property.

12 Claims, No Drawings

THERMOPLASTIC RESIN COMPOSITION

TECHNICAL FIELDS

The present invention relates to a thermoplastic resin composition which comprises a blended composition prepared by mixing a perfluoro type polymer and a liquid crystal polyester and has improved dispersibility and interfacial adhesivity to each other. More specifically the present invention relates to a thermoplastic resin composition which comprises a blended composition prepared by mixing a perfluoro type polymer having methylol groups at the ends of the molecular chain thereof and a liquid crystal polyester.

BACKGROUND ART

Perfluoro type fluorine-containing resins (e.g., PTFE, FEP, PFA and the like) can be used in a wide temperature range and are excellent in chemical resistance, alkali resistance, acid resistance, water resisting property, weather resistance, corrosion resistance, wear resistance, dielectric property and the like, and therefore are used for various uses such as lining materials for pipes, valves, pumps or the like, flexible tubes, films, wafer baskets, pump impellers, machine parts and chemical experimental instruments.

However there are many cases where those resins are inferior in mechanical properties, physical thermal resistance shown by a deflection temperature under load, dimensional stability shown by a coefficient of by linear expansion, moldability and the like.

Particularly since the coefficient of linear expansion is large, there is a case where a thermal deformation occurs when using under the condition of a significant variation of temperature or in a high temperature range. Therefore it is difficult to use molded articles comprising the above-mentioned fluorine-containing resin for parts requiring high accuracy in the field of electronics and for pipes and lining materials which are used on chemical equipments.

Irrespective of attempts made to add inorganic fillers such as carbon fibers and glass fibers to the fluorine-containing resins in order to improve mechanical strength, deflection temperature under load and dimensional stability of molded articles, enough effect is not attained since their affinity such as dispersibility and interfacial adhesivity with the fluorine-containing resin are inferior. On the contrary, moldability and excellent surface properties (non-stickiness, excellent friction property and the like) of fluorine-containing resins are lowered, and at the time of recycling, the fillers are easy to be cut, thereby causing decrease in strength by the repeated recycling.

Also various attempts have been made to improve these drawbacks of the fluorine-containing resin by composing with non-fluorine type heat resisting thermoplastic resin. Among them, a composition with an aromatic polyester forming an anisotropic melt, i.e., a liquid crystal aromatic polyester (hereinafter referred to as "liquid crystal polyester") is reported.

For example, in JP-A-165647/1989 and JP-A-110156/1990, attempts to add, for example, the above-mentioned liquid crystal polyester and the like have been made to lower a coefficient of linear expansion without impairing weather resistance, chemical resistance, wear resistance and antisoil property of the fluorine-containing polymer such as polyvinylidene fluoride (PVDF) and further for the purpose to improve mechanical properties and moldability. A blend of liquid crystal polymer and polytetrafluoridethylene (PTFE) is described, for example, in JP-B-5693/1992, JP-A-230756/1988, etc.

However since surface energy of the fluorine-containing polymer is low, generally there is a problem that its affinity with other materials is inferior. As a result, when the fluorine-containing resin and the liquid crystal polyester are melt-blended, phase separation occurs, i.e. its interfacial adhesivity being substantially nothing and thus interfacial adhesion failure is easy to occur. Also at the time of blending, the liquid crystal polyester is difficult to disperse into the fluorine-containing resin and aggregation occurs, and thus it is difficult to sufficiently exhibit the effect of adding the liquid crystal polyester.

In order to enhance affinity of different polymers, attempts to resolve the above-mentioned drawbacks have been made by adding a so-called compatibilizing agent as the third component.

For example, claim 2 of JP-A-165647/1989, JP-A-197551/1989, JP-A-263144/1989, etc. teach that the addition of an acrylic polymer, poly(vinyl acetate) and poly (vinyl methyl ketone), respectively to the blend of PVDF and anisotropic melt-forming polymer is more effective in comparison with a simple blend.

These are, in substance, examples of using a non-fluorine type compatibilizing agent synthesized by utilizing an excellent affinity of PVDF with a carbonyl-containing polymer such as an acrylic polymer, and the fluorine-containing polymer is limited to PVDF. Also in such an affinity improving method using a compatibilizing agent, there is a problem that since chemical resistance and thermal resistance of the compatibilizing agent itself are inferior to those of a main component polymer, physical properties of the molded articles are lowered.

That is, there has not been obtained any compatibilizing agent which is sufficiently effective in blending a perfluoro type fluorine-containing resin and a liquid crystal polyester.

An object of the present invention is to solve the above-mentioned problems and provide a thermoplastic resin composition which comprises a perfluoro type polymer having methylol groups at its ends and a liquid crystal polyester and gives a molded article having excellent characteristics such as mechanical properties, dimensional stability, moldability and deflection temperature under load with maintaining excellent properties of the perfluoro type fluorine-containing resin such as thermal resistance, chemical resistance, weather resistance, surface properties (non-stickiness, excellent friction property), antisoil property and dielectric property.

DISCLOSURE OF THE INVENTION

The thermoplastic resin composition of the present invention comprises a blend of (A) 0.1 to 99% (% by weight, hereinafter the same) of a fluorine-containing polymer having methylol groups and a number average molecular weight of $5 \times 10^2$ to $5 \times 10^5$ and (B) 1 to 99.9% of a liquid crystal polyester, and the fluorine-containing polymer (A) having methylol groups is at least one selected from the group consisting of perfluoro type polymers having $2 \times 10^2$ to $1 \times 10^5$ methylol groups per $1 \times 10^6$ carbon atoms at its molecular chain end.

It is preferable that the fluorine-containing polymer (A) having methylol groups is at least one selected from the group consisting of perfluoro type polymers having $3 \times 10^2$ to $1 \times 10^5$ methylol groups per $1 \times 10^6$ carbon atoms at its molecular chain end.

It is preferable that the above-mentioned fluorine-containing polymer (A) having methylol groups is a copolymer of tetrafluoroethylene and at least one selected from the group consisting of perfluoro(alkyl vinyl ethers) represented by the formula:

(wherein $R_f$ is a perfluoroalkyl group having 3 or 4 carbon atoms), and that the copolymer is at least one selected from the group consisting of copolymers having 1 to 10% of perfluoro(alkyl vinyl ether) units, $2\times10^2$ to $1\times10^3$ methylol groups per $1\times10^6$ carbon atoms at its molecular chain end and a melt flow rate of 1 to 100 g/10 min under 7 kg load at 380° C.

It is preferable that the above-mentioned fluorine-containing polymer (A) has $3\times10^2$ to $1\times10^3$ methylol groups per $1\times10^6$ carbon atoms at its molecular chain end.

It is preferable to mix 50 to 99% of the fluorine-containing polymer (A) having methylol groups and 1 to 50% of the liquid crystal polyester (B).

Also the present invention relates to a thermoplastic resin composition comprising a blend of (A) 0.1 to 40% of a fluorine-containing polymer having methylol groups and a number average molecular weight of $5\times10^2$ to $5\times10^5$, (B) 1 to 50% of a liquid crystal polyester and (C) a remaining amount of a perfluoro type resin (provided that the sum of the perfluoro type resin and the fluorine-containing polymer having methylol groups is 50 to 99%), wherein the fluorine-containing polymer (A) having methylol groups is at least one selected from the group consisting of perfluoro type polymers having $2\times10^2$ to $1\times10^5$ methylol groups per $1\times10^6$ carbon atoms at its molecular chain end and the perfluoro type resin (C) is at least one selected from the group consisting of PTFE, tetrafluoroethylene/hexafluoropropylene copolymer (FEP) and tetrafluoroethylene/perfluoroalkyl vinyl ether copolymer (PFA) which has less than $2\times10^2$ methylol groups per $1\times10^6$ carbon atoms at its molecular chain end.

It is preferable that the fluorine-containing polymer (A) having methylol groups is at least one selected from the group consisting of perfluoro type polymers having $3\times10^2$ to $1\times10^5$ methylol groups per $1\times10^6$ carbon atoms at its molecular chain end.

It is preferable that the perfluoro type resin (C) is at least one selected from the group consisting of PFA having a melt flow rate of 1 to 60 g/10 min under 7 kg load at 380° C.

It is preferable that the fluorine-containing polymer (A) having methylol groups is a copolymer of tetrafluoroethylene and at least one selected from the group consisting of perfluoro(alkyl vinyl ethers) represented by the formula:

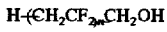

(wherein $R_f$ is a perfluoroalkyl group having 3 or 4 carbon atoms), and that the copolymer is at least one selected from the group consisting of copolymers having 1 to 10% of perfluoro(alkyl vinyl ether) units, $2\times10^2$ to $1\times10^3$ methylol groups per $1\times10^6$ carbon atoms at its molecular chain end and a melt flow rate of 1 to 100 g/10 min under 7 kg load at 380° C.

It is preferable that the fluorine-containing polymer (A) having methylol groups is a copolymer of tetrafluoroethylene and perfluoro(alkyl vinyl ether) and is at least one selected from the group consisting of copolymers having $3\times10^2$ to $1\times10$ methylol groups per $1\times10^6$ carbon atoms at its molecular chain end.

It is preferable that the fluorine-containing polymer (A) having methylol groups is at least one selected from the group consisting of fluorine-containing polymers represented by the formula:

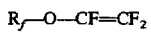

(wherein n is an integer of 5 to $10^3$).

BEST MODES FOR CARRYING OUT THE INVENTION

The fluorine-containing polymers (A) having methylol groups used in the present invention are ones wherein methylol groups are introduced to one end or both ends of perfluoro type polymers such as tetrafluoroethylene homopolymer, tetrafluoroethylene-hexafluoropropylene copolymer, tetrafluoroethylene-perfluoro(alkyl vinyl ether) copolymer and tetrafluoroethylene-perfluoro(alkyl vinyl ether)-hexafluoropropylene terpolymer.

With regard to a molecular weight of these fluorine-containing polymers having methylol groups, it is possible to use polymers from oligomer-like ones being represented, for example, by the formula:

(n:5 to 100) and having a molecular weight of about $5\times10^2$ to about $1\times10^4$ up to ones having a high molecular weight equivalent to that of PTFE, FEP and PFA, and polymers having a number average molecular weight of $5\times10^2$ to $5\times10^5$.

The concentration of the methylol groups in the fluorine-containing polymer (A) used in the present invention can be defined by the number of methylol groups per $1\times10^6$ carbon atoms in the polymer. In the mixing of the perfluoro type polymer and the liquid crystal polyester, the preferable concentration of the methylol groups, which is effective for improving dispersibility and interfacial adhesion is from $2\times10^2$ to $1\times10^5$ per $1\times10^6$ carbon atoms, preferably from $3\times10^2$ to $1\times10^5$ per $1\times10^6$ carbon atoms in the polymer.

When less than $2\times10^2$, there is a tendency that sufficient effects cannot be obtained, and when more than $1\times10^5$, thermal resistance and chemical resistance of the composition tend to be lowered.

The fluorine-containing polymer (A) having methylol groups used in the present invention may consist of molecules which have methylol groups at one or both ends of the molecular chain of the polymer, or may also be a mixture of molecules having methylol groups at one or both ends and ones having no methylol group.

Even if fluorine-containing polymer having no methylol group is present in the fluorine-containing polymer (A) having methylol groups, affinity with the liquid crystal polyester is not impaired if $2\times10^2$ to $1\times10^5$ per $1\times10^6$ carbon atoms, preferably $3\times10^2$ to $1\times10^5$ methylol groups are present as a whole per $1\times10^6$ carbon atoms.

The fluorine-containing polymer (A) having methylol groups can be prepared by various methods.

Methylol groups can be introduced to the end(s) of molecules, for example, by a method in which alcohols such as methanol, ethanol and propanol and mercaptoethanol are used as a chain transfer agent when preparing a perfluoro type polymer by radical polymerization, a method in which an initiator for radical polymerization having hydroxyl group is used, or the like.

Also it is possible to introduce methylol groups to a polymer end through polymer reaction after the polymerization For instance, after the polymerization carried out by using a chain transfer agent and polymerization initiator which can easily convert the polymer end to a segment having methylol groups, the obtained polymer end is converted to the segment having the methylol group through the polymer reaction.

Among these preparation methods, a method in which methanol is used as the chain transfer agent and the methylol group is introduced to the end(s) of the polymer when preparing the perfluoro type polymer by radical polymerization is advantageous and preferable from economical point of view and from a point that thermal resistance and chemical resistance of the obtained fluorine-containing polymer having methylol groups are not lowered.

As the liquid crystal polyester used in the present invention, there is, for example, a liquid crystal copolyester comprising at least one selected from the group consisting of aromatic dicarboxylic acids and alicyclic dicarboxylic acids, at least one selected from the group consisting of aromatic diols, alicyclic diols and aliphatic diols and at least one selected from aromatic hydroxycarboxylic acids. As the typical combinations thereof, there are, for example, polyesters mainly comprising para-hydroxybenzoic acid, biphenyl diol and terephthalic acid (for instance, ECONOL E2000 or E6000 (tradename) available from Sumitomo Chemical Co., Ltd., Xydar RC-FC400 or 300 (tradename) available from Nippon Petrochemicals Co., Ltd., VECTRA C (tradename) Series available from Polyplastics Co., Ltd., UENO LCP2000 (tradename) available from Ueno Fine Chemicals Industry, Ltd., Idemitsu LCP300 (tradename) available from Idemitsu Petrochemicals Co., Ltd. and the like); polyesters mainly comprising para-hydroxybenzoic acid and 6-hydroxynaphthoic acid (for instance, VICTREX SRP (tradename) available from ICI Japan Ltd., UENO LCP100 (tradename) available from Ueno Fine Chemicals Industry, Ltd., VECTRA A (tradename) Series available from Polyplastics Co., Ltd., NOVACCURATE E324 (tradename) available from Mitsubishi Chemical Cop., Idemitsu LCP300 (tradename) available from Idemitsu Petrochemicals Co., Ltd., LODRUN LC-5000 (tradename) available from Unitika, Ltd. and the like); polyesters mainly comprising para-hydroxybenzoic acid, terephthalic acid and an aliphatic diol (for instance, NOVACCURATE E310 (tradename) available from Mitsubishi Chemical Corp., Idemitsu LCP100 (tradename) available from Idemitsu Petrochemicals Co., Ltd., LODRUN LC-3000 (tradename) available from Unitika Ltd., X 7G (tradename) available from Eastman Kodak Co., Ltd. and the like) and others. However the present invention is not limited thereto.

In discriminating these copolymers as to whether or not they are liquid crystal polymers, it is better to utilize their property such that they exhibit optical anisotropy in molten state. The optical anisotropy can be recognized by using a usual polarization microscope. For example, a test piece adjusted to be not more than 1 mm thick is placed on a heating stage and heated at a rate of about 2° C./mm under nitrogen gas atmosphere. The optical anisotropy can be easily recognized by crossing a polarizer and an analyzer of the polarization micorscope at the right angle and observing at forty or one hundred magnifications. In such a method, temperature where those copolymers transit to the liquid crystal phase can also be measured at the same time. There is a case where the measurement is possible by thermal analysis (for example, DSC, TMA, or the like).

The first thermoplastic resin composition of the present invention comprises two components, (A) the fluorine-containing polymer having methylol groups, and (B) the liquid crystal polyester.

In this case, the above-mentioned fluorine-containing polymer (A) having methylol groups can be used. When the thermoplastic resin composition comprising the above-mentioned two components is used for molding, it is preferable to use perfluoro type resins having a number average molecular weight of about $1\times10^5$ to about $5\times10^5$ and methylol groups at the end(s), such as tetrafluoroethylene homopolymer, tetrafluoroethylene-hexafluoropropylene copolymer, tetrafluoroethylene-perfluoro(alkyl vinyl ether) copolymer and tetrafluoroethylene-perfluoro(alkyl vinyl ether)hexafluoropropylene terpolymer. These perfluoro type resins can impart excellent thermal resistance, chemical resistance, electrical properties, mechanical properties and surface properties to the molded articles obtained from the composition of the perfluoro type resins and the liquid crystal polyesters (B).

Further, among them, from the viewpoint of both relatively good moldability and excellent thermal resistance (in other words, wide range of continuous usable temperature), preferable is a fluorine-containing polymer which is a copolymer of tetrafluoroethylene and at least one selected from the group consisting of perfluoro(alkyl vinyl ethers) represented by the formula:

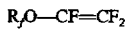

(wherein, $R_f$ is a perfluoroalkyl group having 3 or 4 carbon atoms) and has 1 to 10% by weight of perfluoro(alkyl vinyl ether) units and methylol groups at its molecular chain end(s).

It is preferable that the tetrafluoroethylene-perfluoro(alkyl vinyl ether) copolymer has $2\times10^2$ to $1\times10^3$ methylol groups per $1\times10^6$ carbon atoms, preferably $3\times10^2$ to $1\times10^3$ methylol groups per $1\times10^6$ carbon atoms at its molecular chain end from the viewpoint of dispersibility and affinity at the time of blending with the liquid crystal polyester. Also the melt flow rate of the copolymer is preferably 1 to 100 g/10 min, more preferably 3 to 60 g/10 min.

When the melt flow rate is less than 1 g/10 min, there is a tendency that dispersibility during melt-kneading process becomes insufficient and moldability of the composition is lowered. When more than 100 g/10 min, mechanical strength of the molded article obtained from the composition tends to be lowered.

In the thermoplastic resin composition, there can be used the above-mentioned liquid crystal polyesters, and among them, there is suitably used a polymer forming an anisotropic melt in the molding temperature range of the perfluoro type resin.

That is to say, it is preferable that the molded article obtained from the composition of the present invention comprises the perfluoro type resin and the liquid crystal polyester which is capable of forming an anisotropic melt (in other words, being capable of melting) in the temperature range overlapping partially with the temperature range of the perfluoro type resin where the resin is melted without causing thermal decomposition.

This is because in producing a molded article from the composition of the present invention, there is usually used a method comprising a process step wherein the above-mentioned compositions are dispersed under the molten conditions. In such a method, in case where any one of the perfluoro type resin and the liquid crystal polyester is thermally decomposed, it is not preferable because the physical properties of the obtained molded article are lowered.

For example, in case where the above-mentioned fluorine-containing polymer (A) having methylol groups is he tetrafluoroethylene-perfluoro(alkyl vinyl ether) copolymer, a preferable molding temperature range of the fluorine-containing polymer itself is 300° to 400° C., more preferably 320° to 400° C. As a liquid crystal polyester to be blended with such a polymer (A), it is preferable to select a liquid crystal polyester being moldable in the above-mentioned temperature range. As such preferable liquid crystal polyester, there are, for example, wholly aromatic polyesters, for instance, one mainly comprising para-hydroxybenzoic acid, biphenyl diol and terephthalic acid (for example, ECONOL E2000, E6000 or E7000 (tradename) available from Sumitomo Chemical Co., Ltd., Xydar RC/FC400 or 300 (tradename) available from Nippon Petrochemicals Co., Ltd., VECTRA C (tradename) Series available from Polyplastics Co., Ltd., UENO LCP2000 (tradename) available from Ueno Fine Chemicals Industry, Ltd., IDEMTSU LCP300 (tradename) available from Idemitsu Petrochemicals Co., Ltd. and the like), one mainly comprising para-hydroxybenzoic acid and 6-hydroxynaphthoic acid (for example, VICTREX SRP (tradename) available from ICI Japan, Ltd., VECTRA A (tradename) Series available from Ueno Fine Chemicals Industry, Ltd. NOVACCURATE E324 (tradename) available from Mitsubishi Chemical Corp., IDEMITSU LCP300 (tradename) available from Idemitsu Petrochemicals Co., Ltd., LODRUN LC-5000 (tradename) available from Unitika Ltd. and the like) and others.

Among them, more preferable are the liquid crystal polyesters which have higher thermal resistance, continuous usable temperature and thermal deformation temperature, are sufficiently moldable at the temperature range equivalent to the molding temperature range of the perfluoro type resin and mainly comprise parahydroxybenzoic acid, biphenyl diol and terephthalic acid (for example, ECONOL E2000 or E6000 (tradename) available from Sumitomo Chemical Co., Ltd., Xydar RC/FC400 or 300 (tradename) available from Nippon Petrochemicals Co., Ltd., VECTRA C (tradename) Series available from Polyplastics Co., Ltd., UENO LCP2000 (tradename) available from Ueno Fine Chemicals Industry, Ltd., IDEMITSU LCP300 (tradename) available from Idemitsu Petrochemicals Co., Ltd. and the like) and others.

In the thermoplastic resin composition of the present invention comprising two components of the fluorine-containing polymer (A) having methylol groups and the liquid crystal polyester (B), the proportion of (A)/(B) is 0.1 to 99%/99.9 to 1%, preferably 50 to 99%/50 to 1%, more preferably 60 to 97%/40 to 3%.

When the liquid crystal polyester (B) is less than 3%, the effect of improvement in mechanical strength, a coefficient of linear expansion and moldability of the fluorine-containing polymer tends to decrease, and when more than 40%, the above-mentioned effect of improvement converges to nearly a constant value but on the contrary, excellent chemical resistance, dielectric property, surface properties (non-stickiness, excellent friction property) and the like which the fluorine-containing polymer has tend to be lowered.

The second thermoplastic resin composition of the present invention comprises three components:

(A) fluorine-containing polymer having methylol groups
(B) liquid crystal polyester and
(C) perfluoro type resin.

Namely, the thermoplastic resin composition comprising these three components is the composition of which dispersibility and interfacial adhesion are improved because, when blending the components (C) and (B), the perfluoro type fluorine-containing polymer (A) having more than a specific amount of the methylol groups at its molecular end(s) functions as a compatibilizing agent between the liquid crystal polyester (B) and the perfluoro type resin (C) which has none or less than the specific amount of methylol groups.

More particularly in the composition comprising three components (A), (B) and (C), it can be considered that the composition comprising the fluorine-containing polymer (A) having methylol groups and a part of the liquid crystal polyester functions as a compatibilizing agent between the remaining liquid crystal polyester (B) and the perfluoro type resin (C).

The fluorine-containing polymer (A) having methylol groups, which is effective as the compatibilizing agent, is at least one selected from the group consisting of the perfluoro type polymers having a number average molecular weight of $5\times10^2$ to $5\times10^5$ and having $2\times10^2$ to $1\times10^5$ methylol groups per $1\times10^6$ carbon atoms at its molecular chain end(s).

The fluorine-containing polymers (A) having methylol groups of the present invention are ones wherein methylol groups are introduced to the end of perfluoro type polymers such as tetrafluoroethylene homopolymer, tetrafluoroethylene-hexafluoropropylene copolymer, tetrafluoroethylene-perfluoro(alkyl vinyl ether) copolymer and tetrafluoroethylene-perfluoro(alkyl vinyl ether)-hexafluoropropylene terpolymer.

With regard to a molecular weight of these fluorine-containing polymers having methylol groups, it is possible to use polymers from oligomer-like ones being represented, for example, by the formula:

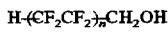

H−(CF$_2$CF$_2$)$_n$−CH$_2$OH (n:5 to 100) and having a molecular weight of about $5\times10^2$ to about $1\times10^4$ up to ones having a high molecular weight equivalent to that of PTFE, FEP and PFA, and polymers having a number average molecular weight of $5\times10^2$ to $5\times10^5$.

The concentration of the methylol groups in the fluorine-containing polymer (A) used in the present invention can be defined by the number of methylol groups per $1\times10^6$ carbon atoms in the polymer. In the mixing of the perfluoro type polymer and the liquid crystal polyester, the preferable concentration of the methylol groups, which is effective for improving dispersibility and interfacial adhesion is from $2\times10^2$ to $1\times10^5$ per $1\times10^6$ carbon atoms, preferably from $3\times10^2$ to $1\times10^5$ per $1\times10^6$ carbon atoms in the polymer.

When less than $2\times10^2$, there is a tendency that sufficient effects cannot be obtained, and when more than $1\times10^5$, thermal resistance and chemical resistance of the composition tend to be lowered.

In the thermoplastic resin composition of the present invention comprising the three components, the perfluoro resin (C) is, for example, a polymer which is one selected from the group consisting of PTFE, FEP and PFA and has no methylol group, hydroxyl group and the like at its molecular chain end(s) or side chain(s), or even if there are, has only as such a small number of groups as less than $2\times10^2$ per $1\times10^6$ carbon atoms.

Among these perfluoro type resins (C), PFA which has relatively good moldability and excellent thermal resistance (in other words, having a wide continuous usable temperature range) is most preferable.

The PFA used in the present invention is a copolymer of tetrafluoroethylene and at least one selected from the group consisting of perfluoro(alkyl vinyl ethers) represented by the formula:

R$_f$—OCF=CF$_2$ (wherein, R$_f$ is a perfluoroalkyl group having 3 or 4 carbon atoms) and is selected from copolymers containing 1 to 10% of perfluoro(alkyl vinyl ether) units. There can be used a copolymer having a melt flow rate of 1 to 100 g/10 min, preferably 1 to 60 g/10 min, more preferably 3 to 50 g/10 min at 380° C. under 7 kg load.

When the above-mentioned melt flow rate is less than 1 g/10 min, there is a tendency that dispersibility becomes insufficient at melt-kneading and moldability of the composition is lowered. When more than 100 g/10 min, mechanical strength of the molded article obtained from the composition tends to be lowered.

As the liquid crystal polyester (B) to be used in the thermoplastic resin composition comprising three components of the present invention, there can be suitably used the liquid crystal polyester equivalent to one used in the above-mentioned thermoplastic resin composition comprising two components.

In the thermoplastic resin composition of the present invention, which comprises three components:

(A) fluorine-containing polymer having methylol groups, (B) liquid crystal polyester and (C) perfluoro type resin, the proportion of (A)/(B)/(C) is 0.1 to 40%/50 to 1%/remaining amount (provided that the sum of (A) and (C) is 50 to 99%), preferably 1 to 30%/40 to 3%/remaining amount (provided that the sum of (A) and (C) is 60 to 97%).

When the liquid crystal polyester (B) is less than 1%, the effect of improvement in mechanical strength, a coefficient of linear expansion and moldability of the perfluoro type resin tends to become insufficient. When more than 50% (that is, the sum of (A) and (C) is less than 50%), excellent chemical resistance, dielectric property, surface properties (non-stickiness, excellent friction property) and the like of the perfluoro type resin tend to be lowered.

Also when the fluorine-containing polymer (A) having methylol groups which acts as a compatibilizing agent between (B) and (C) is less than 0.1% on the basis of the whole amount of the composition, the effect of dispersibility and interfacial adhesion tend to become insufficient.

When the above-mentioned (A) exceeds 30%, thermal resistance, chemical resistance and mechanical properties of the composition and the molded articles obtained therefrom tend to be lowered depending on a kind and molecular weight of (A). When more than 40%, the effect as the compatibilizing agent tends to converge to nearly a certain constant value.

In case where the above-mentioned fluorine-containing polymer (A) having methylol groups, for example, an oligomer-like polymer represented by the formula:

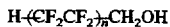

H—(CF$_2$CF$_2$)$_n$—CH$_2$OH (n: integer of 5 to 100) and having a molecular weight of about 5×10$^2$ to about 1×10$^4$ is used as the compatibilizing agent between (B) and (C), the content of (A) is preferably less than 20%, more preferably less than 10% on the basis of the whole amount of the thermoplastic resin composition.

When the above-mentioned oligomer-like polymer is not less than 20%, thermal resistance, chemical resistance and mechanical properties of the composition and the molded articles obtained therefrom tend to be lowered.

The first preferable embodiment of the thermoplastic resin composition of the present invention comprising three components is a blend of (A) a fluorine-containing polymer which is a copolymer of tetrafluoroethylene and at least one selected from the group consisting of perfluoro(alkyl vinyl ethers) represented by the formula:

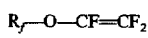

R$_f$—O—CF=CF$_2$ (wherein R$_f$ is a perfluoroalkyl group having 3 or 4 carbon atoms), and the copolymer is at least one selected from the group consisting of copolymers having 1 to 10% of perfluoro(alkyl vinyl ether) units and 2×10$^2$ to 1×10$^3$ methylol groups per 1×10$^6$ carbon atoms at its molecular chain end(s) and a melt flow rate of 1 to 100 g/10 min under 7 kg load at 380° C., (B) a liquid crystal polyester, and (C) PFA having at its molecular end(s) none or less than 2×10$^2$ methylol groups per 1×10$^6$ carbon atoms even if they are contained and the contents of (A), (B) and (C) are 0.1 to 40%, 1 to 50% and the remaining amount (provided that the sum of (A) and (C) is 50 to 99%), respectively.

Namely, this composition is an embodiment showing that in blending the liquid crystal polyester (B) and PFA (C), it is effective, from the viewpoint of compatibility and interfacial adhesion, to mix PFA, as described in the above (A), which has 2×10$^2$ to 1×10$^3$ methylol groups per 1×10$^6$ carbon atoms at its molecular chain end(s), as the compatibilizing agent for (B) and (C).

Particularly the above-mentioned fluorine-containing polymer (A) having 3×10$^2$ to 1×10$^3$ methylol groups per 1×10$^6$ carbon atoms is preferable from the points of dispersibility and interfacial adhesion. It is more preferable that a melt flow rate of the fluorine-containing polymer is in the range of 10 to 100 g/10 min under 7 kg load at 380° C. When the melt flow rate of the fluorine-containing polymer (A) is not less than 10 g.10 min, it effectively contributes to dispersibility when blending with the liquid crystal polyester. On the contrary when more than 100 g/10 min, there is a case where mechanical strength is lowered when the fluorine-containing polymer (A) is blended at a relatively high percentage (30 to 40%).

With regard to the liquid crystal polyester (B), the above-mentioned one is suitably used, and the wholly aromtatic polyesters are preferable from thermal resistance point of view.

The melt flow rate of PFA is 1 to 100 g/10 min, preferably 1 to 60 g/10 min, more preferably 3 to 50 g/10 min. When the melt flow rate is less than 1 g/10 min, there is a tendency that dispersibility becomes insufficient at the time of melting and kneading and moldability of the composition is lowered. When more than 100 g/10 min, mechanical strength of molded articles obtained from the composition tends to be lowered.

The proportion of (A)/(B)/(C) is 0.1 to 40%/50 to 1%/remaining amount, preferably 1 to 30%/40 to 3%/remaining amount, respectively (provided that the sum of (A) and (C) is 50 to 99%, preferably 60 to 97%). When the liquid crystal polyester (B) is less than 1%, the effect of improvement in mechanical strength, a coefficient of linear expansion and moldability of the perfluoro type resin tends to become insufficient, and when more than 50% (that is, the sum of (A) and (C) is less than 50%), excellent chemical resistance, dielectric property, surface properties (non-stickiness, excellent friction property) and the like of the perfluoro type resin tend to deteriorate.

When the fluorine-containing polymer (A) having methylol groups which acts as a compatibilizing agent between (B) and (C) is less than 0.1% on the basis of the whole amount of the composition, the effect of dispersibility and interfacial adhesion of (B) and (C) tends to become insufficient.

When the above-mentioned (A) exceeds 30%, thermal resistance, chemical resistance and mechanical properties of the composition and molded articles obtained therefrom tend to be lowered depending on a kind and molecular weight of (A), and when more than 40%, the effect as the compatibilizing agent between (B) and (C) tends to converge to nearly a constant value.

The second preferable embodiment of the thermoplastic resin composition of the present invention comprising three components is a blend of (A) a fluorine-containing polymer represented by the formula

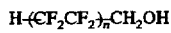

(n: integer of 5 to $10^3$), (B) a liquid crystal polyester, and (C) PFA having at its molecular end(s) none or less than $2\times10^2$ methylol groups per $1\times10^6$ carbon atoms even if they are contained, and the content of (A), (B) and (C) is 0.1 to 20%, 1 to 50% and the remaining amount, respectively (provided that the sum of (A) and (B) is 50 to 99%).

Namely, this composition is an embodiment showing that in blending the liquid crystal polyester (B) and PFA (C), it is effective from the viewpoint of compatibility and interfacial adhesion between (B) and (C) to mix an oligomer-like polymer having methylol groups as shown in (A).

In case where such an oligomer-like fluorine-containing polymer (A) is used, mechanical properties and chemical resistance of the composition tend to be lowered if its amount to be added is too large, and therefore the proportion is preferably less than 20%, more preferably less than 10%.

Accordingly, the most preferable proportion of (A)/(B)/(C) is 0.5 to 10%/40 to 3%/ the remaining amount, respectively (provided that the sum of (A) and (C) is 60 to 97%).

Also the respective preferable examples of (B) liquid crystal polyester and (C) PFA to be suitably used are the same as those described in the above-mentioned first preferable embodiment of the thermoplastic resin composition Though there are various applicable methods to blend the fluorine-containing polymer (A) having methylol groups and the liquid crystal polyester (B) and further to blend a perfluoro type resin (C) having no functional group to (A) and (B), it is necessary to blend under molten and fluidized condition at least at a temperature higher than that where a transition of the liquid crystal polyester to the liquid crystal phase occurs. It is desirable that during the blending, the fluorine-containing polymer (A) having methylol groups and/or the perfluoro type resin (C) are also in the molten state, but blending is possible even if they keep non-melting property for the reason of high melt viscosity.

As the melting and mixing equipment used in the present invention, there are a mixing roll, Banbury mixer, Brabender mixer, extrusion machine and the like. Among them, the extrusion machine is preferable from the points that kneading power is higher and dispersibility in blending to the liquid crystal polyester is all the more expected to be enhanced and also that the productivity at the time of producing the composition is excellent. As the extrusion machine, there can be used a uniaxial extrusion machine or an extrusion machine having two or more screws, and it is particularly preferable to use a biaxial extrusion machine from the points that since the machine has higher kneading power, the composition being excellent in dispersibility can be obtained and also that the kneading power can be optionally controlled.

The thermoplastic resin composition of the present invention is usually formed into pellets, and then used as materials for injection molding. The pelletizing means are not particularly limited. For example, after dry-blending the fluorine-containing polymer (A) having methylol groups and the liquid crystal polyester (B) or dry-blending (A), (B) and the perfluoro type resin (C) by using a tumbling mixer, ribbon blender, Henschel mixer, V blender, rocking mixer or the like, the resulting blend is supplied to an extrusion machine, melted, kneaded, extruded and cut to give pellets. Or (A), (B) and (C) can be supplied to the extrusion machine separately, and then melted and kneaded to give pellets.

The liquid crystal polyesters exemplified hereinabove have excellent mechanical properties (for example, strength, modulus of elasticity and impact strength) normally as the individual molded article. Further molded articles obtained by the injection molding and extrusion molding exhibit increased mechanical properties because the molecules of the polymer are oriented in parallel with the flow direction of the resin at melting. This is an effect of a self-reinforcement of the liquid crystal polymer by forming an anisotropic melt. The degree of increase in mechanical properties is dependent upon the degree of the orientation of the polymer molecules. That is to say, the mechanical properties of melt-molded liquid crystal polymer often vary with a molding method and/or a shape of molded article. Also for the same reason, the melt-molded liquid crystal polymer shows a marked anisotropy with respect to the mechanical properties. Further since the molecular structure of the liquid crystal polymer is of linear form, it usually has a very small coefficient of linear expansion (coefficient of thermal expansion). In addition, it is recognized that the liquid crystal polymer in the molded form shows a further smaller coefficient of linear expansion in the direction parallel with the flow.

Also in case of a molded article obtained from a simple blended composition of the liquid crystal polyester and usual fluorine-containing resin having few or no methylol group, hydroxyl group or other functional groups, since there occurs an orientation of the liquid crystal polyester in the fluorine-containing resin, the properties similar to those of the liquid crystal polyester are endowed, and there is obtained an effect, to a certain extent, on dimensional stability, moldability and the like as compared with a molded article comprising a fluorine-containing resin alone. However the fluorine-containing resin and the liquid crystal polyester originally have poor affinity with each other, and due to this characteristic, dispersibility between them is worse when blending them and aggregation is easy to occur. Also because there is hardly interfacial adhesivity between the fluorine-containing resin and the liquid crystal polyester in the molded article obtained from the blend thereof, interfacial adhesion failure is easy to occur. For this reason, an effect of improvement in mechanical properties, dimensional stability, deflection temperature under load and moldability by adding the liquid crystal polyester becomes insufficient, and excellent properties such as chemical resistance, surface properties (non-stickiness, excellent friction property) and dielectric property of the fluorine-containing resin are remarkably lowered.

The thermoplastic resin composition of the present invention is one wherein $2\times10^2$ to $1\times10^5$ methylol groups are introduced to molecular chain ends of the fluorine-containing polymer per $1\times10^6$ carbon atoms. By using such a composition, dispersibility and interfacial adhesivity, which are insufficient in case of a simple blend of a liquid crystal polyester and a fluorine-containing resin having few or no functional group, are improved. Also the molded article obtained by molding the composition of the present invention has excellent mechanical properties, dimensional stability, deflection temperature under load, moldability, chemical resistance, surface properties and dielectric property.

Namely, the liquid crystal polyester has an ester bond on its trunk chain and hydroxyl group or carboxylic group at its end. Therefore it is considered that by introducing a methylol group into the fluorine-containing polymer, a transesterification with even a part of the ester bonds of the trunk chain of the liquid crystal polyester occurs when melting and kneading at high temperature, resulting in improvement of compatibility between the two, or the introduction of the methylol group enhances a polarity of the fluorine-containing polymer, and particularly interfacial adhesivity with the liquid crystal polyester and dispersibility are enhanced even without a chemical reaction.

The thermoplastic resin composition of the present invention is presumed to be present in the form of:

(1) a simple mixture of (A) a fluorine-containing polymer having methylol groups and (B) a liquid crystal polyester, (2) a reaction product of (A) the fluorine-containing polymer having methylol groups and (B) the liquid crystal polyester or (3) a mixture of (1) and (2) by blending the fluorine-containing polymer (A) having methylol groups at its end and the liquid crystal polyester (B) or by adding a fluorine-containing polymer having methylol groups at its end to a mixture of a fluorine-containing resin and a liquid crystal polyester.

As mentioned above, a mechanism of blending of the present invention is not clear, but it does not restrict the present invention.

Further the resin composition of the present invention may contain, to an extent not to impair its effect, organic or inorganic fillers which are used usually, for example, fiber-like reinforcing agents such as glass fiber, carbon fiber, aramide fiber, graphite whisker, potassium titanate whisker, basic magnesium sulfate whisker, magnesium whisker, magnesium borate whisker, calcium carbonate whisker, calcium sulfate whisker, zinc oxide whisker, aluminum borate whisker, alumina whisker, silicon carbide whisker, silicon nitride whisker, wollastonite, xonolite, sepiolite, gypsum fiber and slag fiber; inorganic fillers such as carbon powder, graphite powder, calcium carbonate powder, talc, mica, clay and glass beads; heat resisting resin such as polyimide, solid lubricants such as molybdenum disulfide, colorants, flame retarders and the like, in an amount of usually 1 to 30% on the basis of the whole amount of the composition. At that time, there is a case where an effect of these fillers is further enhanced because of the presence of unreacted methylol group in the resin composition of the present invention.

The preparation of the fluorine-containing polymer having methylol groups and the perfluoro type resin, which are used in the present invention, are explained below based on REFERENCE EXAMPLES, but the present invention is not limited thereto.

REFERENCE EXAMPLE 1

A tetrafluoroethylene-perfluoro(propyl vinyl ether) copolymer (weight ratio 95/5) was prepared by an aqueous suspension polymerization method described in JP-A-189210/1983.

The end groups of the obtained PFA were —CH$_2$OH, —COOCH$_3$ and COOH, and the number of them were 100, 43 and 2, respectively per $10^6$ carbon atoms.

In accordance with the method described in JP-A-20507/1992, the above-mentioned unstable molecular chain ends of the obtained PFA were treated with a fluorine gas and further an ammonia gas to make these ends stable and make the number of methylol groups to be zero.

With regard to the obtained PFA, the number of end methylol groups and the melt flow rate were measured by the following methods. The results are shown in TABLE 2.

(1) Analysis of an end group (methylol group) of the fluorine-containing polymer Various fluorine-containing polymers are compression-molded at 350° C. for 30 minutes to give 0.25 to 0.3 mm thick films, of which infrared absorption spectra are analyzed and compared with the known infrared absorption spectra of films to determine a kind of end groups, and the number of groups is calculated from the differential spectrum by using the following equation.

$$\frac{\text{Number of end groups}}{(\text{per } 10^6 \text{ carbon atoms})} = \frac{I \times K}{t}$$

I: absorbance
K: correction factor
t: film thickness (mm)

The correction factors for each end group to be analyzed are mentioned below.

| End group | Number of absorbed waves (cm$^{-1}$) | Correction factor |
|---|---|---|
| —COF | 1883 | 440 |
| —COOH | 3560 | 440 |
| —COOCH$_3$ | 1795 | 400 |
| —CONH$_2$ | 3436 | 460 |
| —CH$_2$OH | 3646 | 2300 |

The above-mentioned correction factors were determined from the infrared absorption spectrum of the model compound in order to calculate the number of end groups per $1 \times 10^6$ carbon atoms.

The infrared absorption spectrum analysis was carried out through scanning 100 times by using a Perkin Elmer FTIR spectrometer 1760 X and a Perkin Elmer 7700 Professional Computer (both are products of Perkin Elmer Corporation).

(2) Melt flow rate

The melt flow rate (g/10 min) was measured through preheating for 5 minutes by using a flow tester available from Shimadzu Corporation and a 2 mm diameter and 8 mm long nozzle.

REFERENCE EXAMPLE 2

A 3 liter autoclave lined with glass and equipped with a stirrer was charged with 780 ml of pure water, and the inside of the system was sufficiently replaced by nitrogen gas. Then 600 g of 1,2-dichloro-1,1,2,2-tetrafluoroethane (R-114), 71 g of perfluoro(propyl vinyl ether) and 200 ml of methanol were added, and the inside temperature of the autoclave was adjusted to 35° C. Subsequently tetrafluoroethylene was forcedly fed in the autoclave with stirring so that the inside pressure became 9.5 kgf/cm$^2$G. Then 1.0 g of a solution prepared by dissolving di-(ω-hydroperfluoropropanoyl) peroxide into 1,2,2-trichloro-1,1,2-trifluoroethane (R-113) in a concentration of 10% was forcedly fed to start polymerizing.

As the polymerization reaction advanced, the pressure decreased, and therefore at the time when decreased to 8.5 kgf/cm$^2$G, the pressure was again increased to 9.5 kgf/cm$^2$G by using tetrafluoroethylene. Thus decrease and increase in the pressure was repeated.

During the polymerization, 1.0 g of the above-mentioned initiator solution was added dividedly four times. In seven hours after starting of polymerization, supply of tetrafluoroethylene was stopped, unreacted monomer was purged and the polymer was taken out from the autoclave. Then water rinsing, filtration and drying followed to give 250 g of the copolymer.

19F-NMR analysis indicated that the content of perfluoro (propyl vinyl ether) in the polymer was 5.7% by weight.

With regard to the obtained copolymer, the number of end methylol groups and the melt flow rate were measured by the above-mentioned method. The results are shown in TABLE 2.

REFERENCE EXAMPLE 3

The fluorine-containing copolymer was prepared in the same manner as in REFERENCE EXAMPLE 2 except that 165 ml of methanol was used. The content of perfluoro (propyl vinyl ether) in the copolymer was 5.5%.

With regard to the obtained copolymer, the number of end methylol groups and the melt flow rate were measured by the above-mentioned method. The results are shown in TABLE 2.

REFERENCE EXAMPLE 4

The fluorine-containing copolymer was prepared in the same manner as in REFERENCE EXAMPLE 2 except that 50 ml of methanol and 26 g of perfluoro(propyl vinyl ether) were used.

The content of perfluoro(propyl vinyl ether) in the copolymer was 3.8%.

With regard to the obtained copolymer, the number of end methylol groups and the melt flow rate were measured by the above-mentioned method. The results are shown in TABLE 2.

REFERENCE EXAMPLE 5

A 3 liter autoclave lined with glass and equipped with a stirrer was charged with 780 ml of pure water, 600 g of 1,2-dichloro-1,1,2,2-tetrafluoroethane (R-114), 90 g of perfluoro(propyl vinyl ether) and 120 ml of methanol, and the inside temperature was adjusted to 15° C. Subsequently tetrafluoroethylene was forcedly added with stirring so that the inside pressure becomes 3.0 kgf/cm$^2$G. Afterwards, 1.0 g of a solution prepared by dissolving di-(ω-hydroperfluoropropanoyl) peroxide into 1,2,2-trichloro-1,1,2-trifluoroethane (R-113) in a concentration of 10% was forcedly fed to start polymerization As the polymerization reaction advanced, the pressure decreased, and therefore at the time when decreased to 2.5 kgf/cm$^2$G, the pressure was again increased to 3.0 kgf/cm$^2$G by using tetrafluoroethylene. Thus decrease and increase in the pressure was repeated.

During the polymerization, 1.0 g of the above-mentioned initiator solution was added dividedly four times.

In ten hours after starting of the polymerization, supply of tetrafluoroethylene was stopped, unreacted monomer was purged and the polymer was taken out from the autoclave. Then water rinsing, filtration and drying followed to give 252 g of the copolymer.

19F-NMR analysis indicated that the content of perfluoro (propyl vinyl ether) in the polymer was 5.2%.

With regard to the obtained copolymer, the number of end methylol groups and the melt flow rate were measured by the above-mentioned method. The results are shown in TABLE 2.

The present invention is explained hereinbelow based on EXAMPLES, but is not limited thereto.

EXAMPLE 1

25.4 Grams of a liquid crystal polyester (SUMIKA SUPER LCP E6000 (tradename) available from Sumitomo Kagaku Kabushiki Kaisha) was poured in a 60 cm$^3$ Brabender mixer being set at 340° C., and melted for 2.5 minutes at 10 rpm. Then after adding 54.9 g of PFA obtained in REFERENCE EXAMPLE 1 and mixing for 2 minutes, 4.3 g of the fluorine-containing polymer having methylol groups, which was prepared in REFERENCE EXAMPLE 2, was added at 50 rpm and kneaded for 5 minutes at 100 rpm. The obtained composition was crushed and molded by means of an injection molding machine at a cylinder temperature of 300° to 340° C. and a die temperature of 190° C. to give test pieces.

The tests described below for shrinkage from mold dimensions, tension test, bending test, a coefficient of linear expansion and melt flow rate were carried out by using the obtained test pieces. The results are shown in TABLE 1.

The resin compositions prepared in EXAMPLES and COMPARATIVE EXAMPLES were evaluated by the following testing method.

(3) Tension test

Measurement was made at room temperature at a cross-head speed of 10 mm/min by using a type 5 dumbbell and a Tensilon universal tester available from Orientec Corporation in accordance with ASTM D638.

(4) Bending test

Measurement was made at room temperature at a bending rate of 2 mm/min in accordance with JIS K-6911 by using a Tensilon universal tester available from Orientec Corporation.

(5) Shrinkage from mold dimensions

Shrinkage from mold dimensions in the direction of a molding flow and the direction vertical to the flow were measured in accordance with ASTM D955.

(6) Coefficient of linear expansion

A coefficient of linear expansion was measured at 0.16 kgf/cm$^2$ load at 40° to 150° C. by using TMA available from Rigaku Denki Co., Ltd.

EXAMPLE 2

Kneading and molding were carried out in the same manner as in EXAMPLE 1 except that 50.7 g of PFA obtained in REFERENCE EXAMPLE 1, 25.4 g of the liquid crystal polyester (same as in EXAMPLE 1) and 8.4 g of the fluorine-containing polymer having methylol groups obtained in REFERENCE EXAMPLE 2 were used, and test pieces were prepared. The tests were conducted in the same manner as in EXAMPLE 1. The results are shown in TABLE 1.

EXAMPLE 3

Kneading and molding were carried out in the same manner as in EXAMPLE 1 except that 4.3 g of the fluorine-containing polymer having methylol groups obtained in REFERENCE EXAMPLE 3 was used instead of the fluorine-containing polymer having methylol groups obtained in REFERENCE EXAMPLE 2, and test pieces were prepared. The tests were conducted in the same manner as in EXAMPLE 1. The results are shown in TABLE 1.

COMPARATIVE EXAMPLE 1

Kneading and molding were carried out in the same manner as in EXAMPLE 1 except that only two components, i.e., 59.2 g of PFA obtained in REFERENCE EXAMPLE 1 and 25.3 g of the liquid crystal polyester (same as in EXAMPLE 1) were used, and test pieces were prepared. The tests were conducted in the same manner as in EXAMPLE 1. The results are shown in TABLE 1.

COMPARATIVE EXAMPLE 2

Kneading and molding were carried out in the same manner as in EXAMPLE 1 except that 4.3 g of the fluorine-containing polymer obtained in REFERENCE EXAMPLE 4 was used instead of the fluorine-containing polymer having methylol groups obtained in REFERENCE EXAMPLE 2, and test pieces were prepared. The tests were conducted in the same manner as in EXAMPLE 1. The results are shown in TABLE 1.

COMPARATIVE EXAMPLE 3

Kneading and molding were carried out in the same manner as in EXAMPLE 1 except that 4.3 g of the fluorine-containing polymer obtained in REFERENCE EXAMPLE 5 was used instead of the fluorine-containing polymer having methylol groups obtained in REFERENCE EXAMPLE 2, and test pieces were prepared. The tests were conducted in the same manner as in EXAMPLE 1. The results are shown in TABLE 1.

COMPARATIVE EXAMPLE 4

The PFA shown in REFERENCE EXAMPLE 1 was molded by using an injection molding machine at a cylinder temperature of 300° to 340° C. and a die temperature of 190° C. to give test pieces, and the tests were carried out in the same manner as in EXAMPLE 1. The results are shown in TABLE 1.

temperature under load, particularly dimensional stability represented by shrinkage from mold dimensions and a coefficient of linear expansion, and in addition, can give a molded article excellent characteristics such as thermal resistance, chemical resistance, weather resistance, surface properties (non-stickiness, excellent friction property), anti-soil property and dielectric property which are inherent to a fluorine-containing resin.

As a result, the resin compositions of the present invention can be materials useful particularly for electric and electronic parts such as connectors, chips, carriers, receptacles, printed board and covering materials for wires, which require dimensional stability, thermal resistance and electrical property; parts related to semi-conductors, which require chemical resistance, particularly large size wafer baskets which have been difficult to obtain from a fluorine-containing resin alone because of insufficient moldability and strength; machine parts requiring thermal resistance, sliding property and the like such as valves and chemical pump parts, for example, parts, gears and bearings for fuel line of automobile; and the like.

These resin compositions are useful particularly for electrical and electronic parts such as connectors, chips, receptacles and printed boards; seal rings for automatic mission,

TABLE 1

| | EXAMPLE | | | COMPARATIVE EXAMPLE | | | |
|---|---|---|---|---|---|---|---|
| | 1 | 2 | 3 | 1 | 2 | 3 | 4 |
| Composition (% by weight) | | | | | | | |
| PFA of REFERENCE EXAMPLE 1 | 65 | 60 | 65 | 70 | 65 | 65 | 100 |
| Liquid crystal polyester | 30 | 30 | 30 | 30 | 30 | 30 | — |
| Copolymer of REFERENCE EXAMPLE 2 | 5 | 10 | — | — | — | — | — |
| Copolymer of REFERENCE EXAMPLE 3 | — | — | 5 | — | — | — | — |
| Copolymer of REFERENCE EXAMPLE 4 | — | — | — | — | 5 | — | — |
| Copolymer of REFERENCE EXAMPLE 5 | — | — | — | — | — | 5 | — |
| Shrinkage from mold dimensions (%) | | | | | | | |
| Flow direction | 1.21 | 1.31 | 1.25 | 1.58 | 1.17 | 1.25 | 5.58 |
| Direction vertical to flow | 3.48 | 3.57 | 3.95 | 4.37 | 4.41 | 4.43 | 5.13 |
| Tension test (kgf/cm$^2$) | | | | | | | |
| Tensile strength | 327 | 322 | 295 | 276 | 289 | 286 | 199 |
| Tensile modulus | 35300 | 32000 | 30500 | 28700 | 29100 | 27400 | 6300 |
| Bending test (kgf/cm$^2$) | | | | | | | |
| Bending strength | 252 | 266 | 245 | 222 | 230 | 225 | 200 |
| Bending modulus | 17900 | 18200 | 17500 | 17000 | 17700 | 17200 | 5700 |
| Coefficient of linear expansion (×10$^5$/°C.) | 1.72 | 1.89 | 2.41 | 3.27 | 2.98 | 3.21 | 8.91 |
| Melt flow rate (g/10 min) | 90 | 95 | 80 | 70 | 68 | 75 | 7.9 |

1) at 350° C. under 5 kg load

TABLE 2

| | REF. EX. 1 | REF. EX. 2 | REF. EX. 3 | REF. EX. 4 | REF. EX. 5 |
|---|---|---|---|---|---|
| Number of end methylol groups [1] | 0 | 308 | 223 | 114 | 172 |
| Melt flow rate [2] (g/10 min) | 16 | 48 | 36 | 14 | 46 |

[1] per 1 × 10$^6$ carbon atoms
[2] at 380° C. under 7 kg load

INDUSTRIAL APPLICABILITY

The present invention effectively improves mechanical properties, dimensional stability, moldability and deflection seals for shock absorbers, seals for power steering and chip seals for cooler compressor for automobile; and sliding parts such as piston rings, valve rings and bearings for industrial machinery.

We claim:

1. A thermoplastic resin composition comprising a blend of (A) 0.1 to 99% by weight of a fluorine-containing polymer having methylol groups, a melt flow rate of 1 to 100 g/10 min under 7 kg load at 380° C., and a number average molecular weight of 5×10$^2$ to 5×10$^5$, and (B) 1 to 99.9% by weight of a liquid crystal polyester, and said fluorine-containing polymer (A) having methylol groups is at least one selected from the group consisting of perfluoro polymers having 2×10$^2$ to 1×10$^5$ methylol groups per 1×10$^6$ carbon atoms at its molecular chain end.

2. The thermoplastic resin composition of claim 1, wherein said fluorine-containing polymer (A) having methylol groups is at least one selected from the group consisting of perfluoro type polymers having $3\times10^2$ to $1\times10^5$ methylol groups per $1\times10^6$ carbon atoms at its molecular chain end.

3. The thermoplastic resin composition of claim 1, wherein said fluorine-containing polymer (A) having methylol groups is a copolymer of tetrafluoroethylene and at least one selected from the group consisting of perfluoro(alkyl vinyl ethers) represented by the formula:

$$R_f\text{—O—CF=CF}_2$$

(wherein $R_f$ is a perfluoroalkyl group having 3 or 4 carbon atoms), and said copolymer is at least one selected from the group consisting of copolymers having 1 to 10% by weight of perfluoro(alkyl vinyl ether) units, $2\times10^2$ to $1\times10$ methylol groups per $1\times10^6$ carbon atoms at its molecular chain end and a melt flow rate of 1 to 100 g/10 min under 7 kg load at 380° C.

4. The thermoplastic resin composition of claim 3, wherein said fluorine-containing polymer (A) has $3\times10^2$ to $1\times10^3$ methylol groups per $1\times10^6$ carbon atoms at its molecular chain end.

5. The thermoplastic resin composition of claim 3 which is prepared by mixing 50 to 99% by weight of said fluorine-containing polymer (A) having methylol groups and 1 to 50% by weight of said liquid crystal polyester (B).

6. A thermoplastic resin composition comprising a blend of
(A) 0.1 to 40% by weight of a fluorine-containing polymer having methylol groups and a number average molecular weight of $5\times10^2$ to $5\times10^5$,
(B) 1 to 50% by weight of a liquid crystal polyesters and
(C) a remaining amount of a perfluoro resin (provided that the sum of the perfluoro resin and the fluorine-containing polymer having methylol groups is 50 to 99% by weight), wherein said fluorine-containing polymer (A) having methylol groups is at least one selected from the group consisting of perfluoro polymers having $2\times10^2$ to $1\times10^5$ methylol groups per $1\times10^6$ carbon atoms at its molecular chain end, and said perfluoro resin (C) is at least one selected for the group consisting of poly tetrafluoroethylene, tetrafluoroethylene/hexafluoropropylene copolymer, and tetrafluoroethylene/perfluoroalkyl vinyl ether copolymer which has less than $2\times10^2$ methylol groups per $1\times10^6$ carbon atoms at its molecular chain end.

7. The thermoplastic resin composition of claim 6, wherein said fluorine-containing polymer (A) having methylol groups is at least one selected from the group consisting of perfluoro type polymers having $3\times10^2$ to $1\times10^5$ methylol groups per $1\times10^6$ carbon atoms at its molecular chain end.

8. The thermoplastic resin composition of claim 6, wherein said perfluoro type resin (C) is at least one elected from the group consisting of PFA having a melt low rate of 1 to 60 g/10 min under 7 kg load at 380° C.

9. The thermoplastic resin composition of claim 8, wherein said fluorine-containing polymer (A) having ethylol groups is a copolymer of tetrafluoroethylene and at least one selected from the group consisting of perfluoro(alkyl vinyl ethers) represented by the formula:

$$R_f\text{—OCF=CF}_2$$

(wherein $R_f$ is a perfluoroalkyl group having 3 or 4 carbon atoms), and said copolymer is at least one selected from the group consisting of copolymers having 1 to 10% by weight of perfluoro(alkyl vinyl ether) units, $2\times10^2$ to $1\times10^3$ methylol groups per $1\times10^6$ carbon atoms at its molecular chain end and a melt flow rate of 1 to 100 g/10 min under 7 kg load at 380° C.

10. The thermoplastic resin composition of claim 9, wherein said fluorine-containing polymer (A) having methylol groups is a copolymer of tetrafluoroethylene and perfluoro(alkyl vinyl ether) and is at least one selected from the group consisting of copolymers having $3\times10^2$ to $1\times10^3$ methylol groups per $1\times10^6$ carbon atoms at its molecular chain end.

11. The thermoplastic resin composition of claim 8, wherein said fluorine-containing polymer (A) having methylol groups is at least one selected from the group consisting of fluorine-containing polymers represented by the formula:

$$\text{H—(CF}_2\text{CF}_2\text{)}_n\text{CH}_2\text{OH}$$

(wherein n is an integer of 5 to $10^3$).

12. The thermoplastic resin composition of claim 6, wherein said fluorine-containing polymer (A) having methylol groups is at least one selected from the group consisting of fluorine-containing polymers represented by the formula:

$$\text{H—(CF}_2\text{CF}_2\text{)}_n\text{CH}_2\text{OH}$$

(wherein n is an integer of 5 to $10^3$).

* * * * *